United States Patent [19]

Morsing

[11] 4,219,765
[45] Aug. 26, 1980

[54] SERVOCONTROL HAVING DIGITALIZED DISTANCE DETERMINATION AND VARIABLE GAIN/ATTENUATION COEFFICIENTS

[75] Inventor: Gijsbertus B. Morsing, Heumen, Netherlands

[73] Assignee: Daisy Systems Holland B.V., Netherlands

[21] Appl. No.: 893,896

[22] Filed: Apr. 6, 1978

[30] Foreign Application Priority Data

Apr. 19, 1977 [NL] Netherlands .......................... 7704258

[51] Int. Cl.² ............................................. G05B 13/00
[52] U.S. Cl. .................................... 318/561; 318/616; 318/619
[58] Field of Search ................. 318/561, 616, 618, 619

[56] References Cited

U.S. PATENT DOCUMENTS

| | | | |
|---|---|---|---|
| 3,252,101 | 5/1966 | Gorbatenko | 318/561 |
| 3,512,060 | 5/1970 | Floyd | 318/616 |
| 3,663,880 | 5/1972 | Gabor | 318/603 |
| 3,673,512 | 6/1972 | Walters | 318/618 |
| 3,731,176 | 5/1973 | Mitchell et al. | 318/619 |

FOREIGN PATENT DOCUMENTS

| | | |
|---|---|---|
| 2207677 | 8/1972 | Fed. Rep. of Germany . |
| 288975 | 3/1975 | Netherlands . |
| 841816 | 7/1960 | United Kingdom . |
| 1150726 | 4/1969 | United Kingdom . |

OTHER PUBLICATIONS

Reed, "Access-Control System with Reduced Velocity Error," *IBM Technical Disclosure Bulletin,* Oct. 1976, p. 1884.

*Primary Examiner*—J. V. Truhe
*Assistant Examiner*—Eugene S. Indyk
*Attorney, Agent, or Firm*—Biebel, French & Nauman

[57] ABSTRACT

A servo system for controlling the position and speed of movable members coupled to the shaft of a motor. To maintain these members as accurately as possible in the desired position, the motor is included in a servoloop having a critical setting so that this setting is established only during the operative condition of the members coupled to the motor shaft. Moreover, the critical setting is automatically re-adjustable.

7 Claims, 6 Drawing Figures

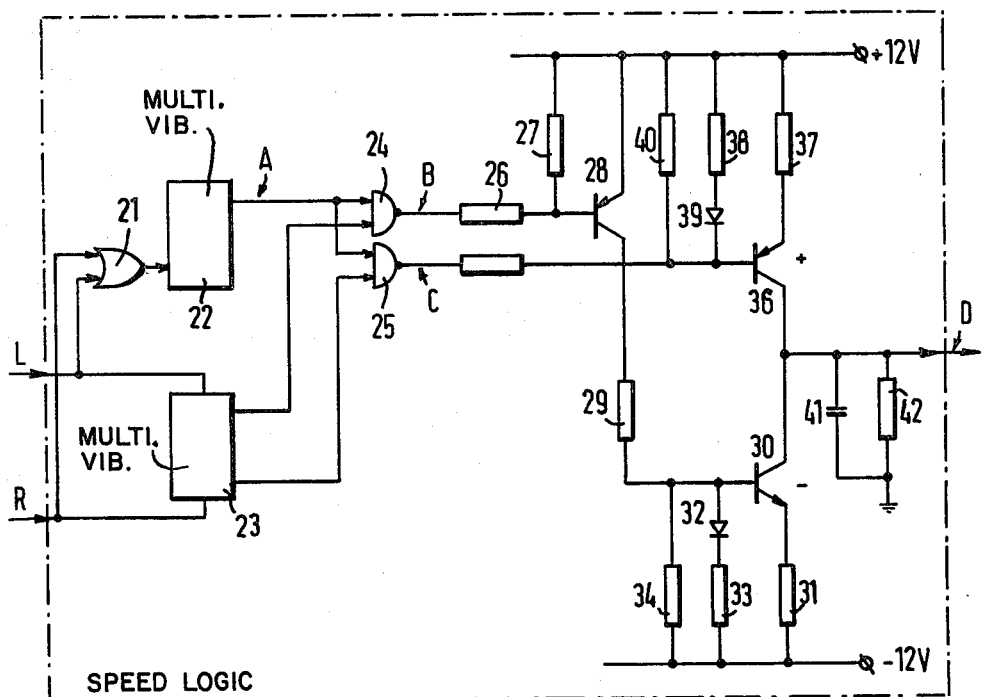
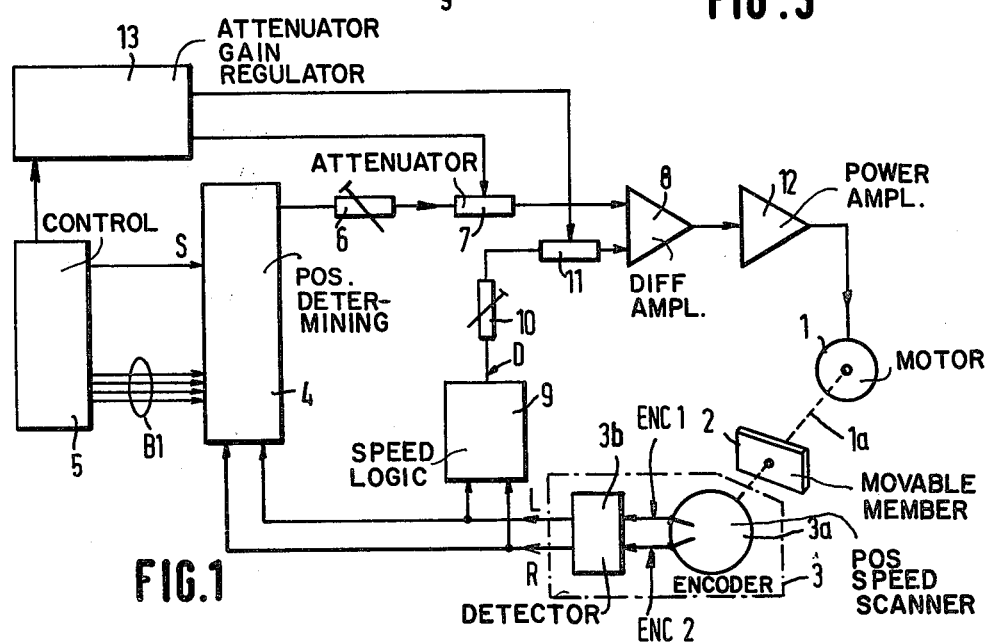

SERVOCONTROL HAVING DIGITALIZED DISTANCE DETERMINATION AND VARIABLE GAIN/ATTENUATION COEFFICIENTS

The invention relates to a servo system for controlling the position and speed of members coupled to the shaft of a motor.

A large number of systems require the stopping of one or more movable members at a highly accurate position. For example, in an electronically controlled printing machine it is vital, especially if this machine is connected to a computer, that the movable members coupled to the motor shaft (e.g. a sphere or wheel having characters mounted thereon, the carriage or platen of a typewriter), which members are to make a desired print of a character on a record medium, are moved into the proper position as rapidly as possible and are maintained in this position during the making of the print.

In order to optimally accurately maintain these movable members in the proper position, it is known to connect the motor driving these members in a servoloop having a highly critical setting.

To realize such a highly critical setting, the motor shaft is coupled to a position-speed scanner producing at least two encoded cyclic position signals which are phase-shifted relative to each other, each cycle of these position signals being proportional to a predetermined unit of relative rotation of the motor shaft. The known servoloop further includes speed logic means for generating from the encoded position signals output analog signals that are representative of the desired instantaneous speed of rotation of the motor shaft; motor position determining means in which the encoded position signals are converted into analog signals that are indicative of the angular rotation to be still performed by the motor shaft; and a differential amplifier in which the output signals from the speed logic means are compared with the analog signals from the motor position determining means so as to generate a difference signal that is applied to a power amplifier in which the difference signal is converted into an amplified current signal that is applied to the motor windings so as to control the position and speed of the members coupled to the motor shaft.

In order to set the motor for maximum criticality, the two output analog signals from the speed logic means and the motor position determining means respectively are controlled by means of potentiometers. However, such a critical setting of the motor is very difficult to maintain as the setting will wander from the most optimal setting due to, for example, play of the drive shaft of the motor or flexibility of the members coupled to the motor shaft, such as the wheel or the carriage of the typewriter, and further due to wear and subsequent misadjustment of the electric and electronic components, and hence oscillations will occur in the feedback system of the loop; this means that the motor shaft may start to oscillate, resulting in an accelerated wear of the members coupled thereto, thus making it more difficult to accurately maintain the desired position during the printing of a character. It will be clear that the critical setting will have to be periodically re-adjusted, which requires a skilled operator. In the known servoloop often an encoding device is used which produces analog signals that are indicative of the position of the motor shaft. However, these analog position signals, which are generally of sinusoidal or triangular shape, are not fully representative of the position of the motor shaft as the signals may be readily affected by, for example, the temperature both outside and inside the encoding device and fluctuations in the supply voltage. As a result thereof, it is not possible to optimally set the servoloop. This drawback may be eliminated by using an encoding device that produces digital position signals, by means whereof analog signals are generated which will generally be step-shaped. However, such a stepped signal entails the drawback that it is impossible to set the loop so that no oscillation occurs.

Another drawback inherent in the critical setting of the above servoloop is that the motor, for example after the printing of a character, will be rigidly maintained in its last printing position or operative condition even during the subsequent period or rest condition during which no character is printed. In other words, the rest condition is actually identical to the operative condition, so that the motor is unnecessarily loaded in the rest condition and hence excessive heat is developed, while due to the oscillations of the motor shaft, moreover, the noise level is considerably high.

It is an object of the invention to eliminate the above drawbacks.

This object is achieved as in accordance with the invention attenuating means are provided which affect the input signal of the power amplifier by independently controlling the transmission functions of both the analog motor position signal and the analog speed signal to this input signal, the control being made dependent upon the operative-rest condition of the members coupled to the motor shaft.

In this manner it is achieved that a critical setting is established only during the operative condition. As a result, considerably less heat will be developed. Moreover, noise due to oscillations is no longer perceptible. The oscillations can be maintained between given amplitude limits. Furthermore, as a result of the automatic control and the fact that the servoloop is no longer critically set, no periodic re-adjustment of the critical setting by a skilled operator is required. Generally speaking, by means of the invention it is achieved that the gain factor and the attenuation coefficient are made dependent upon the conditions of use of the machine in such a manner that oscillations and the noise resultant therefrom, heat development and wear of members coupled to the motor shaft do not occur for a longer period and at a greater amplitude than required for a proper operation of the entire arrangement (printing machine) in which the servo system is employed. The invention renders it possible to use a digital encoding device of low resolution as oscillations due to digitalization effects do not constitute an impediment.

In accordance with the invention, the attenuating means comprise two attenuators, one of which is connected between the speed logic means and the differential amplifier for attenuating the output analog signals generated by the speed logic means, and the other of which is connected between the motor position determining means and the differential amplifier for attenuating the output analog signals generated by the motor position determining means, or the attenuating means comprise two attenuators, one of which is connected between the speed logic means and the differential amplifier for attenuating the output analog signals generated by the speed logic means, and the other of which is connected between the output of the differential amplifier and the input of the power amplifier for attenuating the difference signal.

The two attenuators can concurrently be set at the desired values by a single operative or rest signal, as a result whereof a highly simplified adjustment can be achieved.

The invention will be described in greater detail hereinafter with reference to the accompanying drawings, in which:

FIG. 1 shows a block diagram of a first embodiment of the invention;

FIG. 3 shows a schematic diagram of the speed logic means shown in FIGS. 1 and 2;

Figures 4A, 4B:
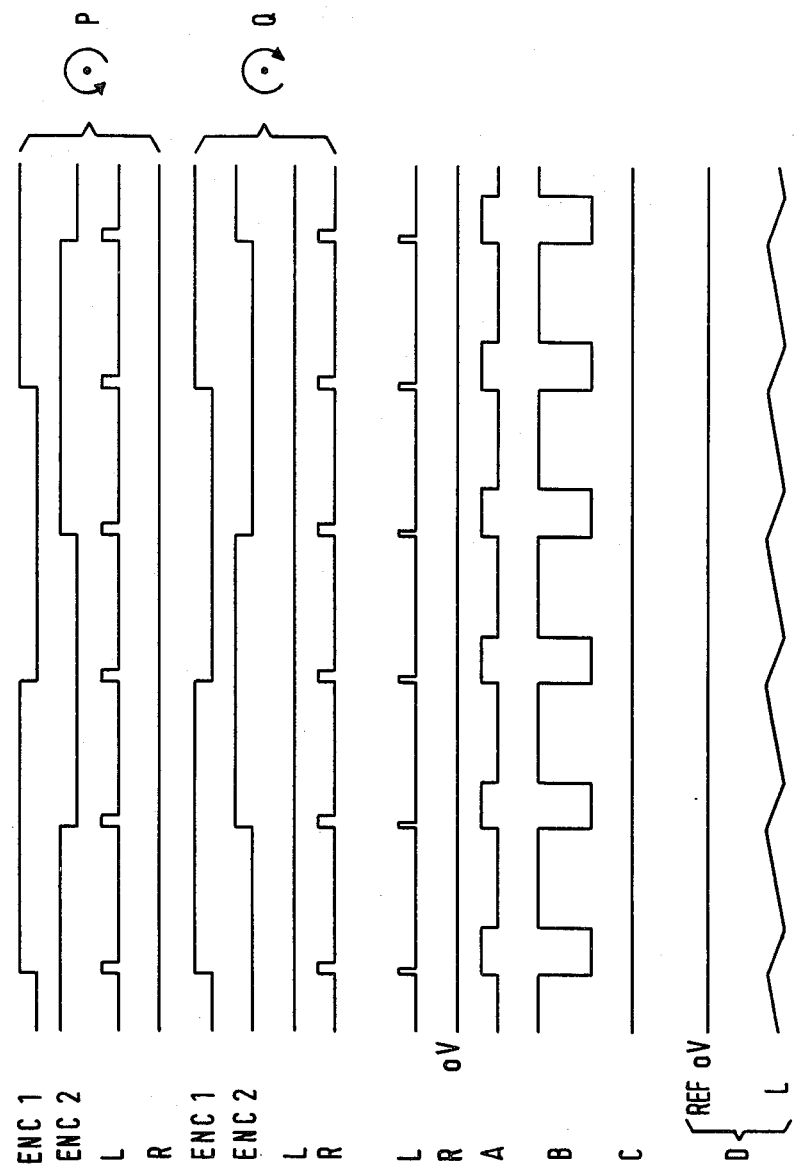
FIG. 4a shows waveforms associated with the encoding means shown in FIGS. 1 and 2.
FIG. 4b shows waveforms in illustration of FIG. 3 in the event of counter-clockwise rotation of the motor.

FIG. 1 shows a motor 1 comprising a motor shaft 1a on which movable members (e.g. a wheel having characters mounted thereon), as represented by block 2, as well as a position-speed scanner 3a are mounted. The positionspeed scanner is arranged so that it generates two digital signals ENC1 and ENC2 (see FIG. 4a). At constant motor speed, these two signals are symmetrically block-shaped and, in dependence upon the sense of rotation of the motor, are phase-shifted relative to each other by plus or minus 90°. The two signals are applied to a detector 3b in which they are converted into count pulses as upon each passage of an edge of each one of signals ENC1 and ENC2, a pulse will be produced in dependence upon the sense of rotation of the motor: a so-called left-pulse L when the motor rotates in left-hand direction (i.e. counter-clockwise: P), and a so-called right-pulse R when the motor rotates in right-hand direction (i.e. clockwise: Q). These count pulses, i.e. left- and right-pulses L and R are shown in FIG. 4a. Detector 3b has two outputs, the left-pulses L being applied to one and the right-pulses R being applied to the other of these outputs. Position-speed scanner 3a and detector 3b together constitute the encoder 3.

The two outputs of detector 3b, which are at the same time the outputs of encoder 3, are connected to motor position determining means 4. To these motor position determining means 4 there is also applied, from control means 5, a displacement command in the form of a start pulse S so as to apply the desired distance of displacement of the motor shaft likewise from control means 5 (through bus B1) to these motor position determining means 4 in order to generate an output analog signal that is indicative of the angular rotation to be still performed by the motor shaft. The operation of motor position determining means 4 will be described in greater detail later on with reference to FIG. 2. The output signal from motor position determining means 4 is applied through an adjustable potentiometer 6 and through a first attenuator 7 to one of the two inputs of a differential amplifier 8.

The two outputs of encoder 3 are further connected to speed logic means 9 in which the left- or right-signal is converted into an analog signal that is proportional to the instantaneous rotational speed of the motor shaft. This analog signal is applied through a second attenuator 11 to the second input of differential amplifier 8. In this differential amplifier the two analog signals are compared and the resultant difference signal is applied to the input of a power amplifier 12, in which this difference signal is converted into a current signal that is applied to the motor windings so as to place the motor shaft in the desired position.

Potentiometers 6 and 10 are adapted to adjust the servo positioning behaviour at a selected operative condition of the servo system.

When using attenuators 7 and 11, which are dependent upon the rest-operative condition of the servo system, it appears that the setting of potentiometer 6 is no longer critical. This potentiometer may even be readily omitted, so that there is one point of adjustment less and hence the chance of faulty operation of the system is reduced.

Control means 5 is further connected to an attenuation and gain factor regulator 13 having two outputs, each of which outputs is connected to one of attenuators 7 and 11.

When a displacement command is applied to motor position determining means 4, at the same time a control signal is applied to regulator 13 which, in response thereto, applies a signal to each one of the attenuators so as to set these attenuators to each have the desired attenuation or gain factor. The two attenuators need not provide equal attenuation or amplification.

Figure 2:
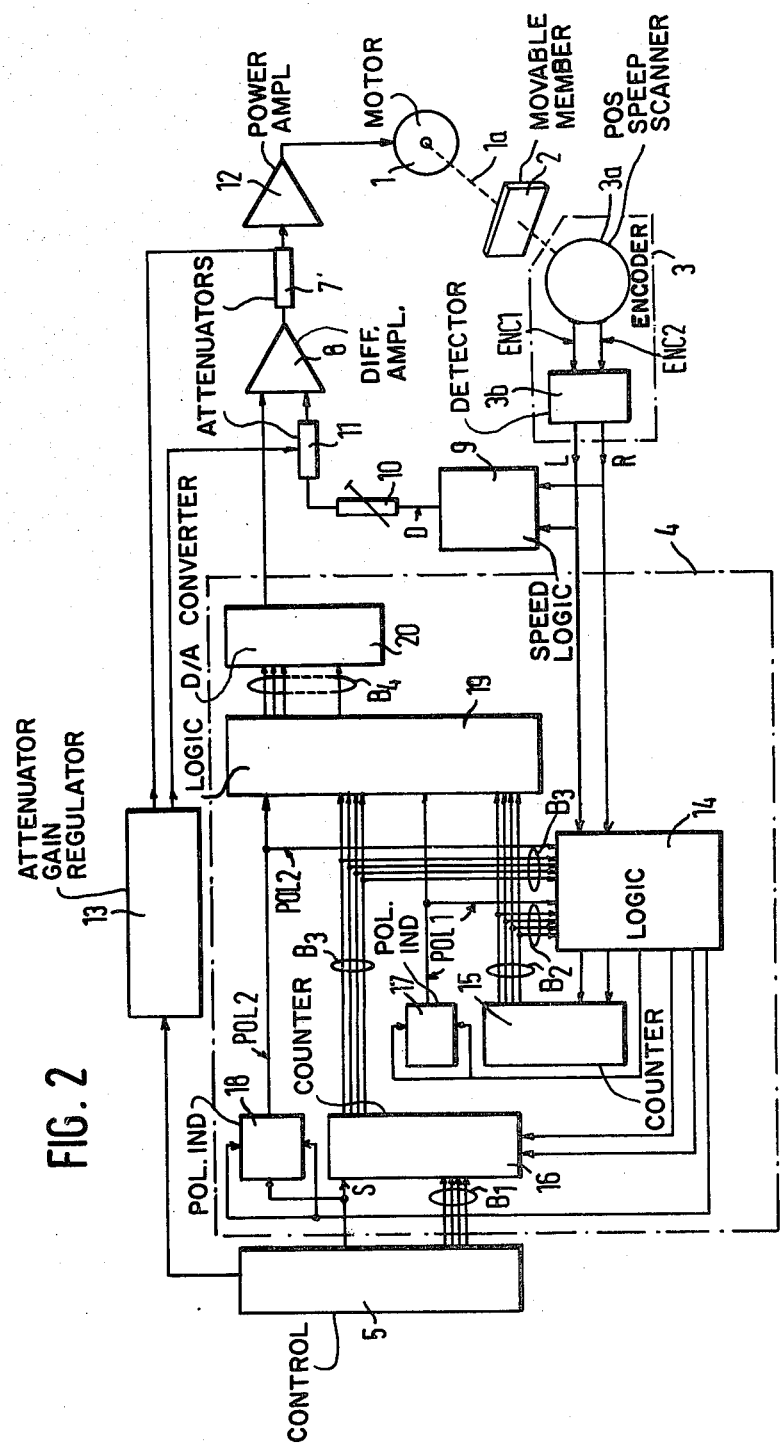
FIG. 2 shows a block diagram of a second embodiment of the invention.

The arrangement shown in FIG. 2 is a modification of that shown in FIG. 1 to the effect that attenuator 7 of the latter is connected as attenuator 7' in the former in the output conductor of differential amplifier 8. Potentiometer 6 is absent in this arrangement. For the rest, FIG. 2 is essentially identical to FIG. 1. However, FIG. 2 shows in greater detail the circuitry of the motor position determining means 4.

As shown in FIG. 2, motor position determining means 4 comprise a logic circuit 14 to which the left- and right-pulses L and R are applied from encoder 3. Circuit 14 is connected to two digital up- and down-counters 15 and 16 which each have a polarity indicator unit 17 and 18 producing polarity bits POL1 and POL2 (see FIG. 4c) so that one increment of counter 16 (see FIG. 4c) corresponds with a predetermined number 2N of left- or righ-pulses derived from the position signals L and R generated by encoder 3 (see FIG. 4a).

Figure 4C:
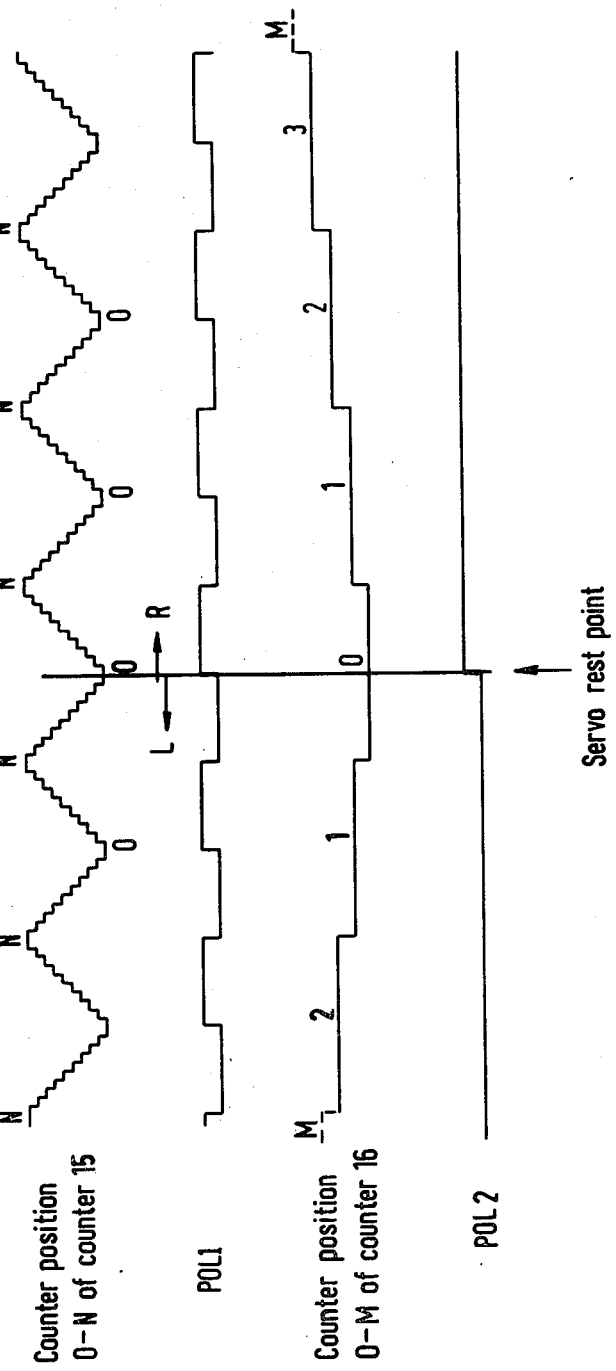
FIG. 4c shows waveforms associated with the motor position determining means shown in FIG. 2.

The POL1 and POL2 bits as well as the contents of counters 15 and 16 are returned through the POL1 and POL2 lines and buses B2 and B3 to logic circuit 14 to provide a counting diagram as shown in FIG. 4c.

Motor position determining means 4 further comprise a logic circuit 19 to which also the POL1 and POL2 bits and the positions of counters 15 and 16 are applied through POL1 and POL2 lines and buses B2 and B3. Logic circuit 19 decodes a number of digital signals from polarity bits POL1 and POL2 and from the position of counters 15 and 16, which digital signals are applied through bus B4 to digital-to-analog converter 20 which is responsive thereto to produce the aforesaid analog position determining output signal that is indicative of the angular rotation to be still performed by the motor shaft.

As stated earlier, a displacement command is supplied through control means 5, as a result whereof counter 16 and polarity bit unit 18, in response to a start pulse S, are actuated through bus B1 to have a position corresponding with the desired distance of displacement of the motor shaft. The servo system will automatically reset counters 15 and 16 to zero. The new zero position of the counters will correspond with a different position of the motor shaft.

In the embodiment shown in FIG. 2 the position of counter 15 need not be exactly zero at the instant the start pulse S is produced. However, such an in itself allowable mispositioning may not cumulate during successive displacement commands. Therefore it is of utmost importance that the count position of counter 15, and the polarity bit POL1 of polarity bit unit 17 are not affected by start pulse S but change only in response to left- and right-pulses from encoder 3.

Unlike in the arrangement shown in FIG. 1, the analog signal from motor position determining means 4 is directly applied to differential amplifier 8, attenuator 7 (in the form of attenuator 7' as stated earlier) being connected between differential amplifier 8 and power amplifier 12. It has appeared that in this arrangement the operation of the servoloop is fully identical to that of the servoloop shown in FIG. 1. However, the attenuators used in the arrangement of FIG. 1 being essentially composed of high-ohmic resistors and a plurality of field-effect transistors, the attenuators used in the arrangement of FIG. 2 comprise resistors of more favourable values and require a smaller number of field-effect transistors, which constitutes an advantage from the point of view of circuit structure, especially with a view to increased miniaturization of the servoloop.

FIG. 3 shows a schematic diagram of speed logic means 9 used in the arrangements shown in FIGS. 1 and 2. Left- and right-pulses L and R are applied through OR gate 21 to a trigger input of a monostable multivibrator 22 which, in response to the application of a left-pulse L or a right-pulse R, is triggered to generate a pulse of predetermined fixed duration (see FIG. 4b, waveform A). The left- and right-pulses are further each applied to a separate input of a bistable multivibrator 23, left-pulse L setting this multivibrator and right-pulse R resetting it.

The output of multivibrator 22 is connected to a first input of two NAND gates 24 and 25 having open collector output, while the output of multivibrator 23 is connected to a second input of the two NAND gates. The output of NAND gate 24 is connected through a series-connection of resistors 26 and 27 to a positive terminal of a voltage supply (e.g. +12 volts). The junction point of resistors 26 and 27 is connected to the base of a transistor 28 which has its emitter connected to the aforesaid positive terminal of the voltage supply and has its collector connected through a resistor 28 to the base of a transistor 30. The emitter of transistor 30 is connected through a resistor 31 to a negative terminal of the voltage supply (e.g. −12 volts). A series-connection of a diode 32 and a resistor 33 is connected between the base of transistor 30 and this negative terminal, diode 32 being conductive in the direction of the negative terminal. A resistor 34 is connected in shunt with the series-connection of diode 32 and resistor 33. The collector of transistor 30 is connected to one terminal of a parallel-connection of a capacitor 41 and a resistor 42, the other terminal of this parallel-connection being connected to ground. The one terminal of the parallel-connection at the same time constitutes the output of speed logic means 9.

The output of NAND gate 25 is connected through a resistor 35 to the base of a transistor 36 having its emitter connected through a resistor 37 to the positive terminal. A series-arrangement of a diode 39 and a resistor 38 is connected between the base of transistor 36 and the positive terminal, diode 39 being conductive in the direction of the base of transistor 36. A resistor 40 is connected in shunt with the series-connection of diode 39 and resistor 38. The collector of transistor 36 is connected to the aforesaid one terminal of the parallel-connection of capacitor 41 and resistor 42.

When, for example, a left-pulse L is applied to the input of speed logic means 9, multivibrator 22 is triggered and multivibrator 23 is set. As a result thereof, an output pulse is produced at NAND gate 24 (see FIG. 4b, waveform B). Transistor 28 will become conductive and, as a result of the resistance division of resistors 29 and 33, a constant voltage will be produced at the base of transistor 30. Consequently, this transistor 30 functions as an emitter follower and this leads to a constant emitter current. At a sufficiently high current gain factor of transistor 30, the collector current generated will be practically equal to the emitter current. As multivibrator 22 applies a signal to NAND gate 25 and multivibrator 23 does not apply a signal thereto, NAND gate 25 will not produce a low output signal (see B in FIG. 4b), so that transistor 36 remains in the non-conductive state. It will be clear that in this situation a current circuit is established through the parallel-connection of capacitor 41 and resistor 42 and through the collector-emitter path of transistor 30, as a result whereof capacitor 41 will be charged accordingly (see C in FIG. 4b). It will further be clear that, when a right-pulse R is applied to speed logic means 9, transistor 36 will become conductive while transistor 30 be blocked. The resultant current circuit is so that capacitor 41 will be charged in opposite direction. In FIG. 3 the "plus" sign associated with transistor 36 and the "minus" sign associated with transistor 30 indicate the respective current supplies; i.e., transistor 30 operates as a negative current supply while transistor 36 operates as a positive current supply. When the motor shaft generate right-pulses R transistor 36 will deliver a charge +Q into the capacitor 41 for each right pulse R. At a right pulse R repetition rate f the resulting charge current will be Q.f. As the resulting average discharge current through resistor 42 will equal this averaged charge current the resulting voltage U will be proportional to the repetition frequency f.($U=Q.f.R_{42}$) wherein $R_{42}$ is resistor 42. It can be seen that in case of left-pulses L the resulting voltage U will be negative ($U=Q.f.R_{42}$). Therefore voltage produced across the parallel-connection of capacitor 41 and resistor 42 (see C in FIG. 4b) is indicative of the angular speed of the motor shaft.

It is observed that diodes 32 and 39 serve for the temperature compensation of the base-emitter junctions of transistors 30 and 36. Resistors 34 and 40, which are both high-ohmic with respect to resistors 33 and 38, serve to secure the blocked condition of transistors 30 and 36 respectively, i.e. to render these transistors non-responsive to any possible leakage currents.

Though the present invention is being described in relation to a high-speed printing machine, the above embodiments are, in general, applicable also to machines operating on the basis of an operative-rest condition. Moreover, without exceeding the scope of the present invention, a large number of modifications and changes may be made. For example, an arrangement is possible in which the motor position determining signal is obtained by using an absolute position encoding device instead of an incremental encoding device (block 3, FIG. 1). By an absolute encoding device is understood a device adapted to read the absolute position (angle) of the motor shaft. This can be realized by using a plurality of scanners to scan a number of adjacent tracks of a coding disc so that these scanners generate a plurality of digital signals representing the instantaneous position of the motor shaft. The use of such an absolute encoding device has the advantage that the arrangement of block 4 (FIG. 2) may be considerably simplified as, for example, the counters may be omitted.

I claim:

1. A servo system for controlling the position and speed of members coupled to the shaft of a motor, comprising a position-speed scanner coupled to said shaft and producing at least two encoded cyclic position signals which are phase-shifted relative to each other, each cycle of said position signals being proportional to a predetermined unit of relative rotation of said motor shaft; speed logic means for generating from said encoded position signals output analog signals that are representative of the actual instantaneous speed of rotation of the motor shaft; motor position determining means in which said encoded position signals are converted into analog signals that are indicative of the angular rotation to be still performed by said motor shaft; and a differential amplifier in which the output signals from said speed logic means are compared with the analog signals from said motor position determining means so as to generate a difference signal that is applied to a power amplifier in which said difference signal is converted into an amplified current signal that is applied to the motor windings so as to control the position and speed of the members coupled to said motor shaft, characterized in that attenuating means are provided which affect the input signal of said power amplifier by independently controlling the transmission functions of both the analog motor position signal and the analog speed signal to said input signal, the control being made dependent upon the operative-rest condition of said members coupled to said motor shaft, wherein said operative condition is valid while said members are moved to a desired position or accurately kept at a desired position and wherein said rest condition is valid when said accurate positioning of said members is no longer required to avoid oscillations due to a nonideal position indication or a nonideal tachometer behavior.

2. A servo system according to claim 1, characterized in that said attenuating means comprise two attenuators (7, 11), one (11) of which is connected between said speed logic means (9) and said differential amplifier (8) for attenuating said output analog signals generated by said speed logic means, and the other (7) of which is connected between said motor position determining means (4) and said differential amplifier (8) for attenuating the output analog signals generated by said motor position determining means.

3. A servo system according to claim 1, characterized in that said attenuating means comprise two attenuators (7', 11), one (11) of which is connected between said speed logic means (9) and said differential amplifier (8) for attenuating the output analog signals generated by said speed logic means, and the other (7') of which is connected between the output of said differential amplifier (8) and the input of said power amplifier (12) for attenuating said difference signal.

4. A servo system according to claims 1, 2, or 3, characterized in that said attenuators (7 or 7', 11) are controlled by a single binary signal indicating said rest condition or operative condition of said members.

5. A servo system according to claim 1, characterized in that said at least two encoded cyclic position signals are relatively phase-shifted block-shaped signals.

6. A servo system according to claims 1 or 5, characterized in that said speed logic means (9) include a charge storage member (41) that is charged with a predetermined charge (+Q; −Q) in response to each occurrence of an edge of one of the block-shaped signals applied to said speed logic means, the polarity of said charge depending upon the sense of rotation of said motor shaft, and that said charge storage member (41) is discharged through a resistor (42), the instantaneous voltage (+U; −U) across said charge storage member being indicative of the instantaneous angular speed of said motor shaft.

7. A servo system accordingly to claims 1 or 5, characterized in that said motor position determining means (4) include two digital up- and down-counters (15, 16) each having a polarity indication so that one increment of one counter (16) corresponds with a predetermined number of cycles of the position signals generated by the encoder (3), the other counter (15) counting said predetermined number of cycles, and that for realizing a motor shaft displacement said counter (16) is imparted a position corresponding with the desired motor shaft displacement, without affecting the other counter (15) including its polarity indication to avoid accumulation of small errors.

* * * * *